United States Patent
Bluvband et al.

(10) Patent No.: US 9,038,120 B2
(45) Date of Patent: May 19, 2015

(54) SYSTEMS, APPARATUSES, METHODS AND COMPUTER EXECUTABLE CODE FOR FACILITATING BROADCAST, PUBLICATION AND/OR SHARING OF VIDEO FROM A USER DEVICE TO ONE OR MORE OTHER USER DEVICES IN A SOCIAL NETWORKING ENVIRONMENT

(71) Applicant: Silent Communication Ltd., Tel Aviv (IL)

(72) Inventors: Max Eitan Bluvband, Gibton (IL); Shahar Hajdu, Givataim (IL)

(73) Assignee: LIVE LENS LTD., Tel Aviv (IL)

( * ) Notice: Subject to any disclaimer, the term of this patent is extended or adjusted under 35 U.S.C. 154(b) by 0 days.

(21) Appl. No.: 13/924,576

(22) Filed: Jun. 23, 2013

(65) Prior Publication Data
US 2013/0347046 A1    Dec. 26, 2013

Related U.S. Application Data

(60) Provisional application No. 61/663,659, filed on Jun. 25, 2012, provisional application No. 61/670,684, filed on Jul. 12, 2012, provisional application No. 61/726,591, filed on Nov. 15, 2012.

(51) Int. Cl.
| | |
|---|---|
| *H04N 7/16* | (2011.01) |
| *G06F 3/00* | (2006.01) |
| *G06Q 50/00* | (2012.01) |
| *H04N 7/15* | (2006.01) |
| *H04N 21/4788* | (2011.01) |
| *H04N 21/258* | (2011.01) |
| *H04N 21/4223* | (2011.01) |
| *G06Q 30/02* | (2012.01) |
| *H04L 29/06* | (2006.01) |

(52) U.S. Cl.
CPC ............... *G06F 3/005* (2013.01); *G06Q 50/01* (2013.01); *H04N 7/15* (2013.01); *H04N 21/4788* (2013.01); *H04N 21/25875* (2013.01); *H04N 21/4223* (2013.01); *H04L 65/4076* (2013.01); *G06Q 30/02* (2013.01)

(58) Field of Classification Search
CPC ............. H04N 1/42; H04N 7/14; H04N 7/15; H04N 21/4788
USPC .................................. 725/109, 133, 141, 153
See application file for complete search history.

(56) References Cited

U.S. PATENT DOCUMENTS

2010/0128103 A1* 5/2010 Sim et al. .................... 348/14.02

* cited by examiner

*Primary Examiner* — Dominic D Saltarelli
(74) *Attorney, Agent, or Firm* — Vladimir Sherman; Professional Patent Solutions

(57) ABSTRACT

The present invention includes systems, apparatuses, methods and computer executable code for facilitating broadcast, publication and/or sharing of video from a user device to one or more other user devices in a social networking environment. According to some embodiments of the present invention, there may be provided systems, apparatuses, methods and computer executable code for facilitating live broadcast of video captured by a user device image sensor to one or more other users associated with the broadcasting user within a social networking site (e.g. facebook).

20 Claims, 18 Drawing Sheets

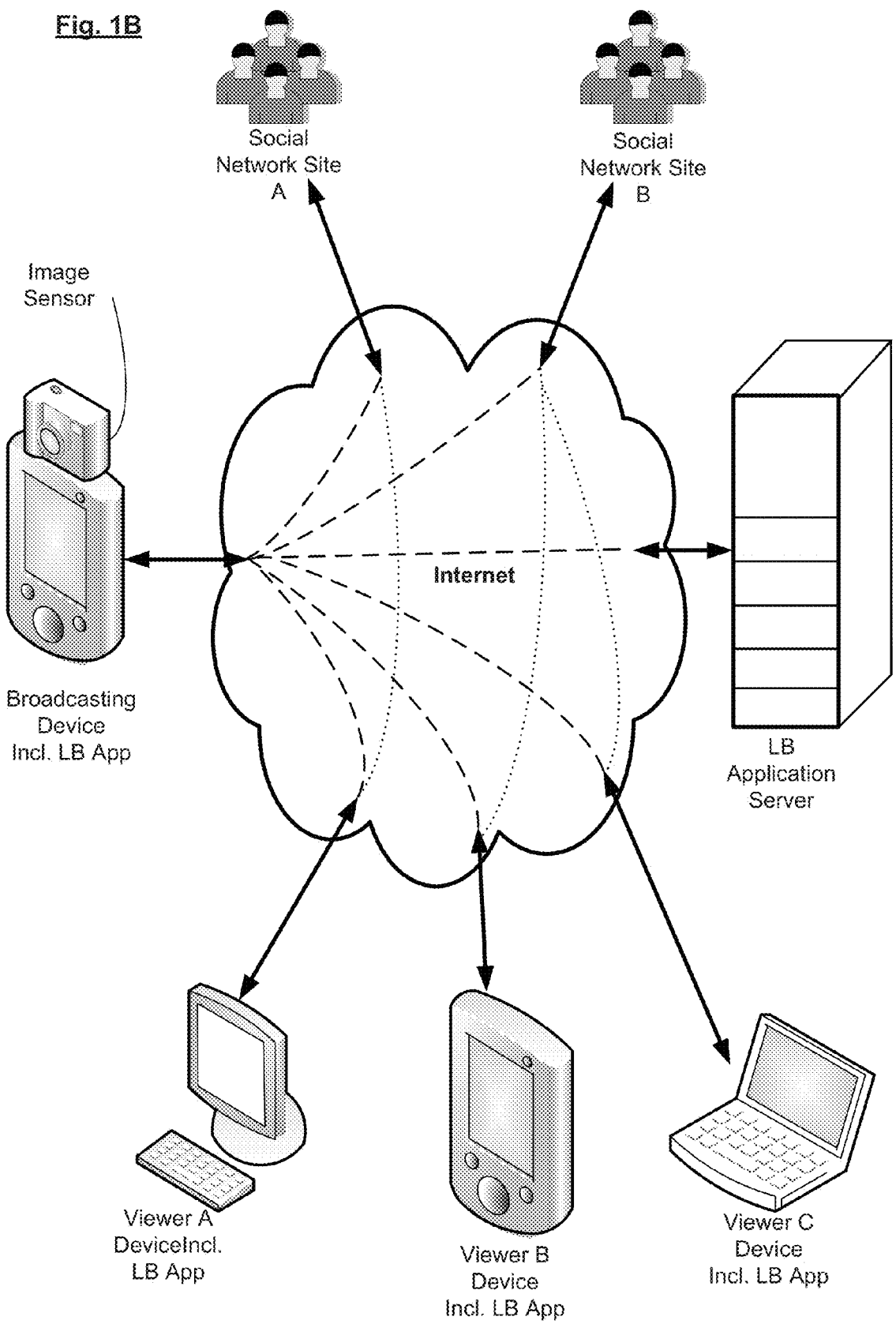

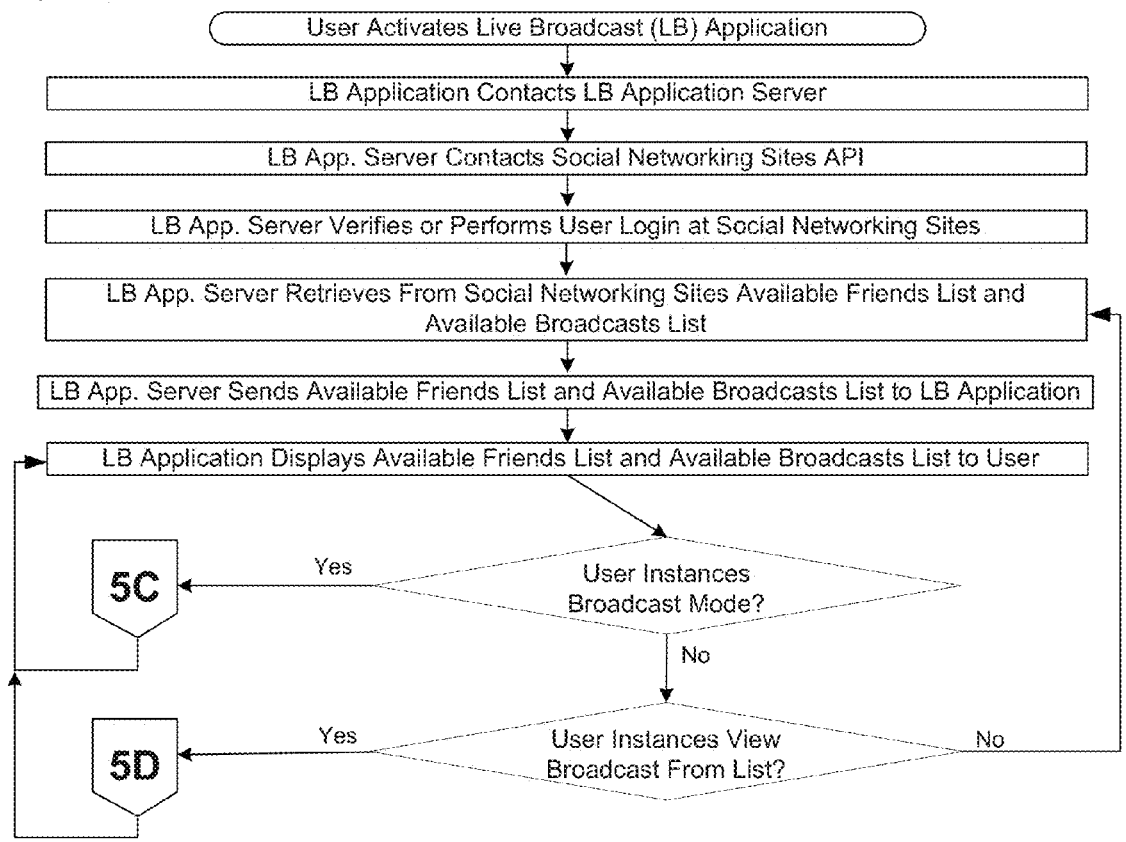

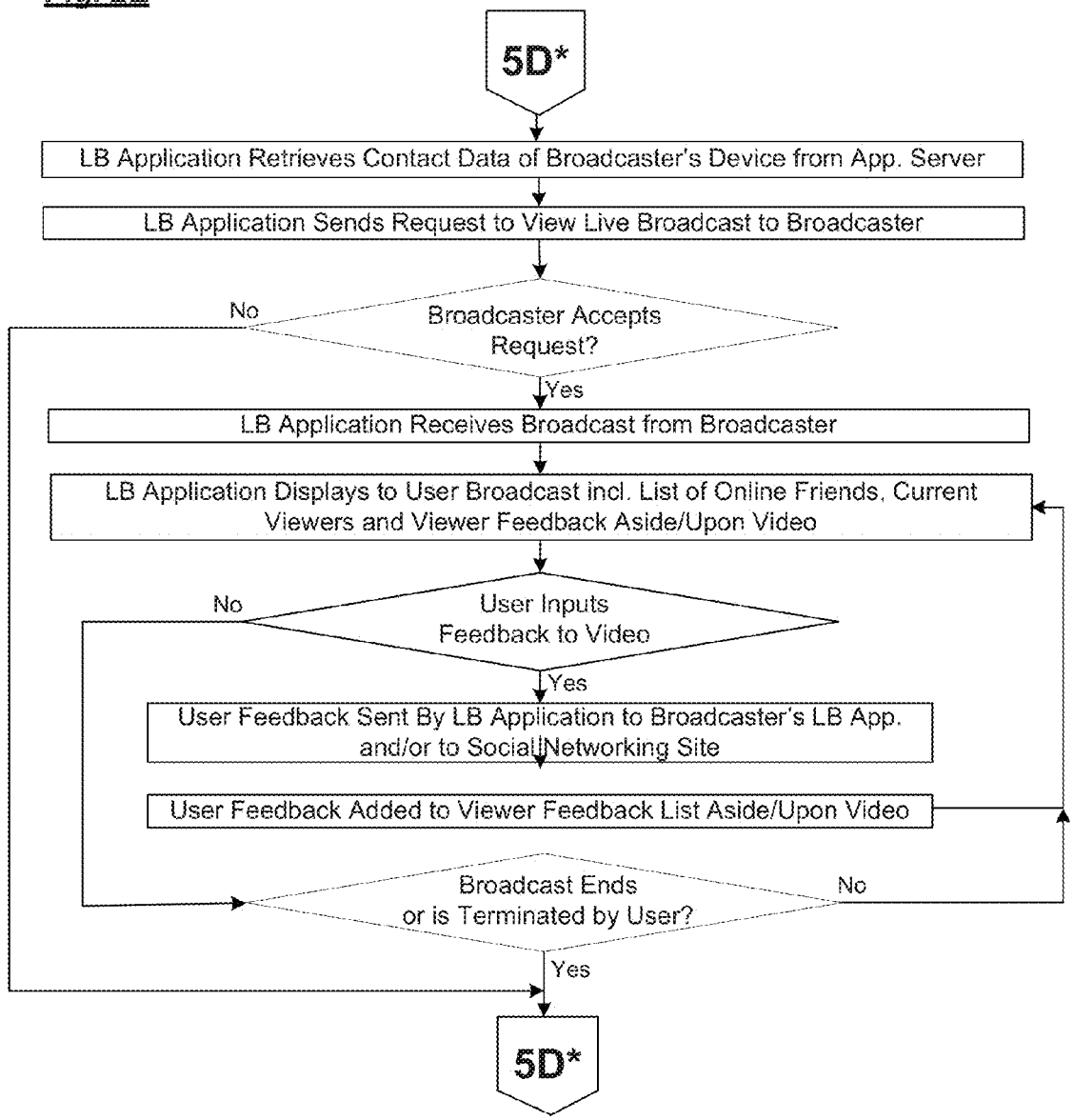

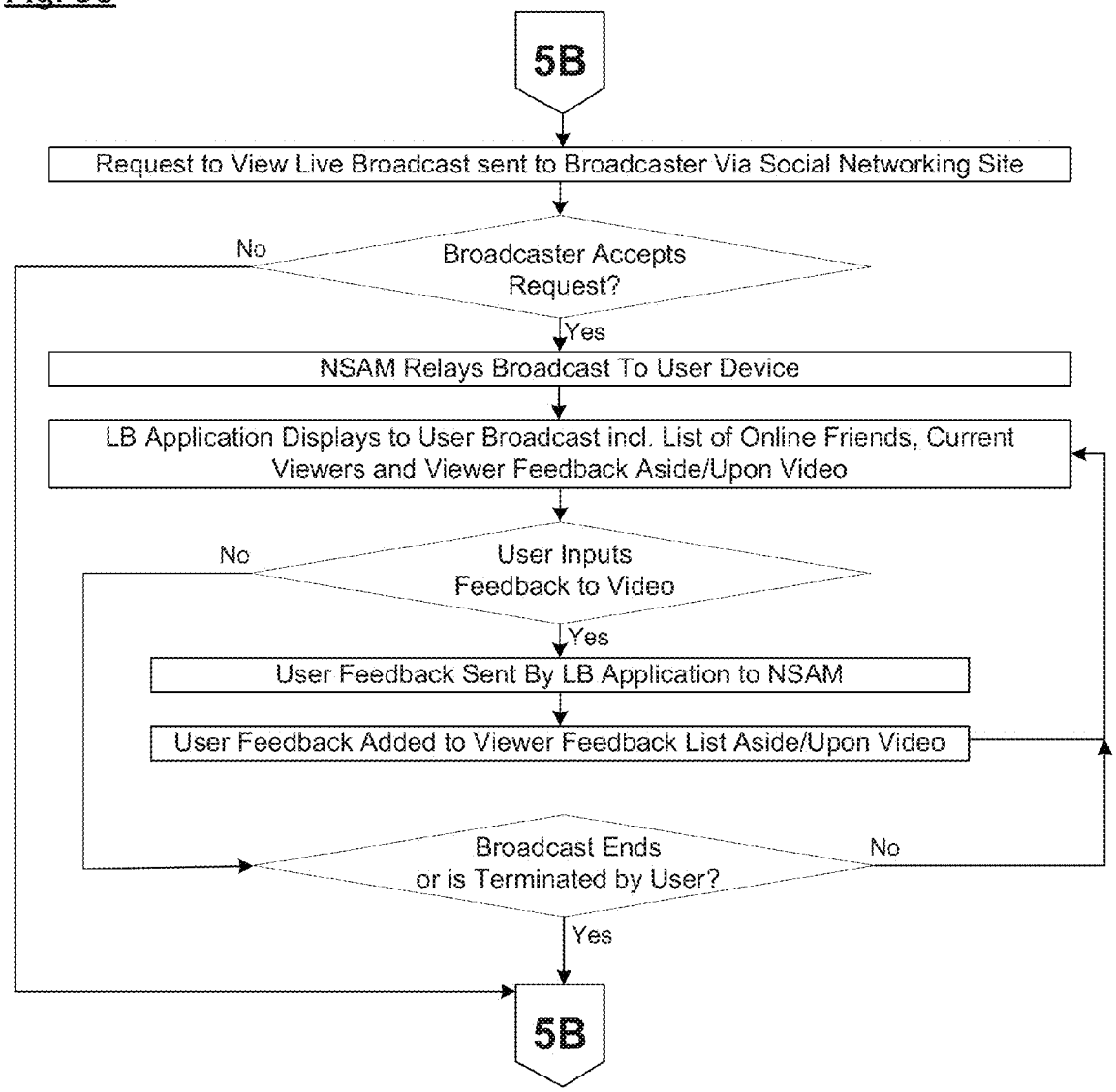

SYSTEMS, APPARATUSES, METHODS AND COMPUTER EXECUTABLE CODE FOR FACILITATING BROADCAST, PUBLICATION AND/OR SHARING OF VIDEO FROM A USER DEVICE TO ONE OR MORE OTHER USER DEVICES IN A SOCIAL NETWORKING ENVIRONMENT

PRIORITY CLAIMS

The present application claims priority from U.S. Provisional Patent Application No. 61/663,659, titled: "Systems, Apparatuses, Methods and Computer Executable Code for Facilitating Broadcast, Publication and/or Sharing of Video from a User Device to one or more Other User Devices in a Social Networking Environment", filed by the inventors of the present application on Jun. 25, 2012, from U.S. Provisional Patent Application No. 61/670,684, titled: "Systems, Apparatuses, Methods and Computer Executable Code for Providing an Interactive Friends and/or Contacts Graphic User Interface", filed by the inventors of the present application on Jul. 12, 2012, and from U.S. Provisional Patent Application No. 61/726,591, titled: "Systems, Apparatuses, Methods and Computer Executable Code for Providing an Interactive Friends and/or Contacts Graphic User Interface", filed by the inventors of the present application on Nov. 15, 2012, all of which are hereby incorporated by reference into the present application in their entirety.

FIELD OF THE INVENTION

The present invention generally relates to mobile communications. More specifically, the present invention relates to systems, apparatuses, methods and computer executable code for facilitating broadcast, publication and/or sharing of video from a user device to one or more other user devices in a social networking environment.

BACKGROUND

Over the past couple decades the use of mobile communication devices has spread like wildfire throughout human civilization. The permeation of these devices into human society has been so complete that nearly every individual on the planet now carries a mobile communication device. As mobile devices became more and more common their sophistication has advanced in leaps and bounds, such that nowadays most modern mobile devices provide all the functionalities of a home computer, including multimedia and data networking.

These advances in mobile technology alongside its ever-growing use have produced an endless plethora of social networking platforms. Throughout the world people use these platforms to share their everyday experiences, thoughts and interests with each other. Platforms such as Facebook and Instagram have become so popular that it is now extremely difficult to find an individual who is not at least a semi-active member, whereas many are extremely active and even continuously monitoring their profiles, posting and "liking".

The desire to share with others and receive their approval/disapproval as well as their thoughts and opinions appears to be a very fundamental human trait. There is therefore a need to provide further functionalities to social networking platforms and create further venues and mediums for users to share their everyday experiences, thoughts and interests with each other and receive their feedback.

SUMMARY OF THE INVENTION

The present invention includes systems, apparatuses, methods and computer executable code for facilitating broadcast, publication and/or sharing of video from a user device to one or more other user devices in a social networking environment. According to some embodiments of the present invention, there may be provided systems, apparatuses, methods and computer executable code for facilitating live broadcast of video captured by a user device image sensor to one or more other users associated with the broadcasting user within a social networking site (e.g. facebook). It should be understood that "live broadcast" described in this disclosure may include, according to some embodiments, broadcast of video currently being captured, video currently being captured with a delay (buffered) and/or broadcast of previously captured video. The present invention may further provide for the viewing users to input live feedback (e.g. "like", comments, ratings, etc.) to the broadcasted video and may yet further provide for integrating live feedback into or alongside the broadcasted video. According to yet further embodiments, the present invention may provide for viewing and/or broadcasting users to view data relating to the status of other users associated with them on a social networking site, within or alongside the video, and may further provide for inviting such users to view the live video and/or to request to view a currently broadcasted video. The present invention may further provide for users viewing and/or broadcasting a live broadcast to view indicators, within or alongside the video, indicating which other users are currently viewing, were previously viewing, and/or are not viewing the broadcast.

According to some embodiments, there may be provided a Live Broadcasting Application (hereinafter referred to as a: "LB App") adapted to reside within or be functionally associated with a user device, which user device includes distributed data network access functionality (e.g. a mobile phone). A LB App may be adapted to interact with a user of the associated user device via the device's user interface and once instanced may be adapted to activate and/or receive data from an image sensor of the device. A LB App may be further adapted to communicate by use of the device's communication functionalities, via a distributed data network (e.g. the internet) possibly via a LB App server, with a social networking site or service and with other users who are members of the social networking site or service (social networking sites and services hereinafter collectively referred to as: "SNS"). The LB App may be adapted to receive from SNS data relating to members of the SNS (e.g. photo and online status) and may further display data retrieved from the SNS to a user of the associated device. According to further embodiments, a LB App may be adapted to display data retrieved from SNS alongside or within/upon (e.g. as an overlay) a video being viewed and/or being captured by the user. A LB App may be further adapted to receive and include in displayed data identities of parties currently viewing the video and/or feedback to the video received from the viewing parties.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1D: are illustrations of exemplary LB systems for facilitating live broadcast of video from a user device, via a distributed data network, within an exemplary operating environment, all in accordance with some embodiments of the present invention, wherein:

FIG. 1A demonstrates an exemplary LB system in which there is provided a LB App Server, through which all system communications are routed;

FIG. 1B demonstrates an exemplary LB system in which there is provided a LB App Server, which provides users with contact details of other users, however, communications between users are direct (based on the contact details provided);

FIG. 1C demonstrates an exemplary LB system in which the functionality of a LB App Server is performed by modules or servers hosted or otherwise embedded in Social Networking Sites, and through which all system communications are routed; and FIG. 1D demonstrates an exemplary LB system in which the functionality of a LB App Server is performed by modules or servers hosted or otherwise embedded in Social Networking Sites, which provide users with contact details of other users, however, communications between users are direct (based on the contact details provided);

FIGS. 2A-2C: are flowcharts presenting exemplary steps of operation of an exemplary LB system, in which there is provided a LB App Server, through which all system communications are routed, all in accordance with some embodiments of the present invention, wherein:

FIG. 2A presents the initial operation of the exemplary system;

FIG. 2B presents the broadcasting operation of the exemplary system; and

FIG. 2C presents the viewing operation of the exemplary system;

FIGS. 2D-2E: are alternate flowcharts to FIGS. 2B & 2C respectively, presenting alternative exemplary steps of broadcasting and viewing operation of an exemplary LB system, in which there is provided a LB App Server, which provides users with contact details of other users, however, communications between users are direct (based on the contact details provided), all in accordance with some embodiments of the present invention;

FIGS. 3A-3C: are flowcharts presenting exemplary steps of operation of an exemplary LB system, in which the functionality of a LB App Server is performed by modules or servers hosted or otherwise embedded in Social Networking Sites, and through which all system communications are routed, all in accordance with some embodiments of the present invention, wherein:

FIG. 3A presents the initial operation of the exemplary system;

FIG. 3B presents the broadcasting operation of the exemplary system; and

FIG. 3C presents the viewing operation of the exemplary system;

FIGS. 5A-5E: are screenshots of a display of an exemplary LB App, all in accordance with some embodiments of the present invention, wherein:

FIG. 5A demonstrates an exemplary screenshot in "Broadcast" mode;

FIG. 5B demonstrates an exemplary screenshot in "viewing" mode;

FIG. 5C demonstrates an exemplary screenshot of a list of current broadcasts;

FIG. 5D demonstrates an exemplary screenshot of a broadcast including display of feedback to the broadcast; and FIG. 5E demonstrates an exemplary screenshot of a list of contacts including indications of contact status (e.g. who is online).

Figure 1A:
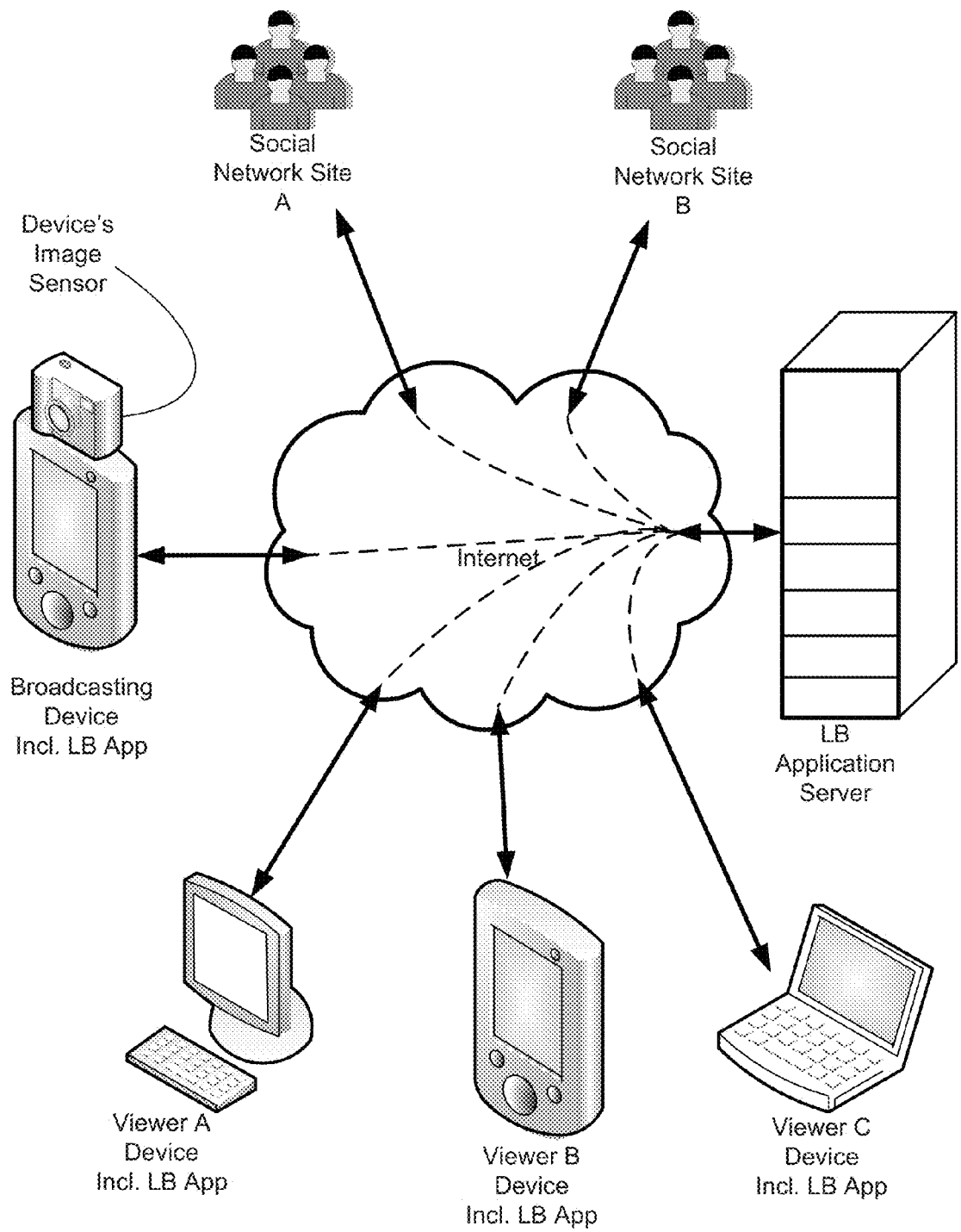
Figure 1C:
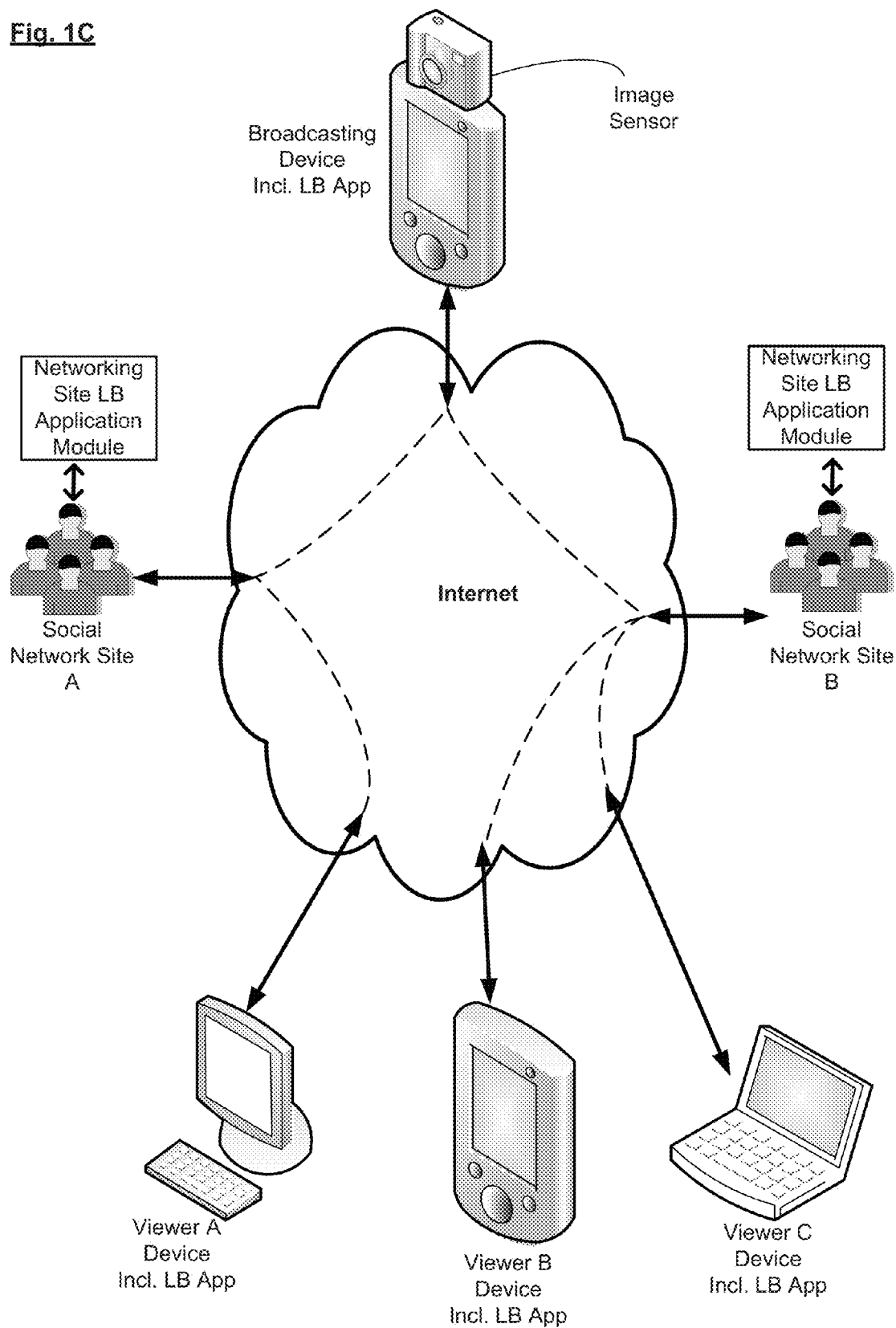
Figure 1D:
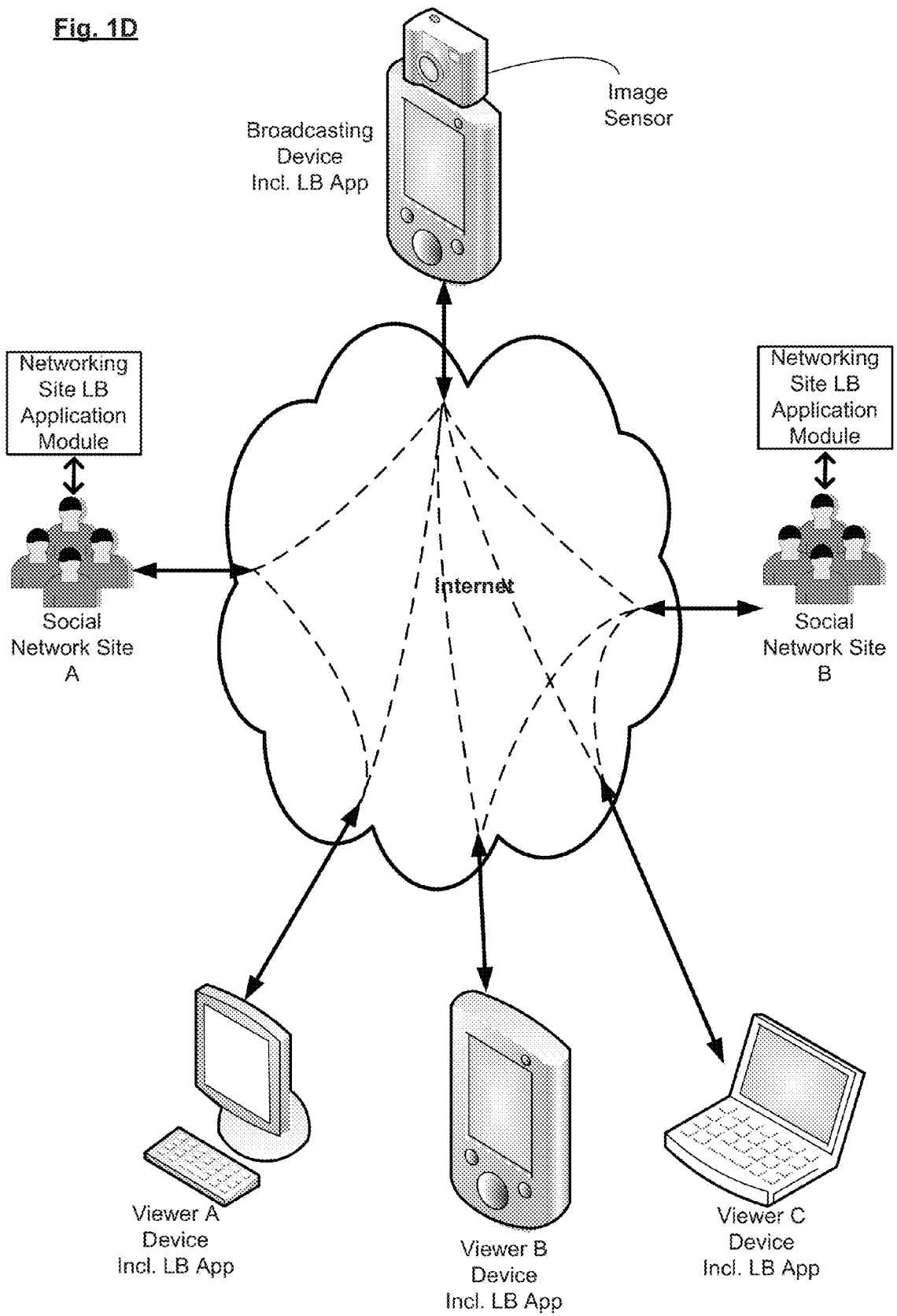
Figure 2B:
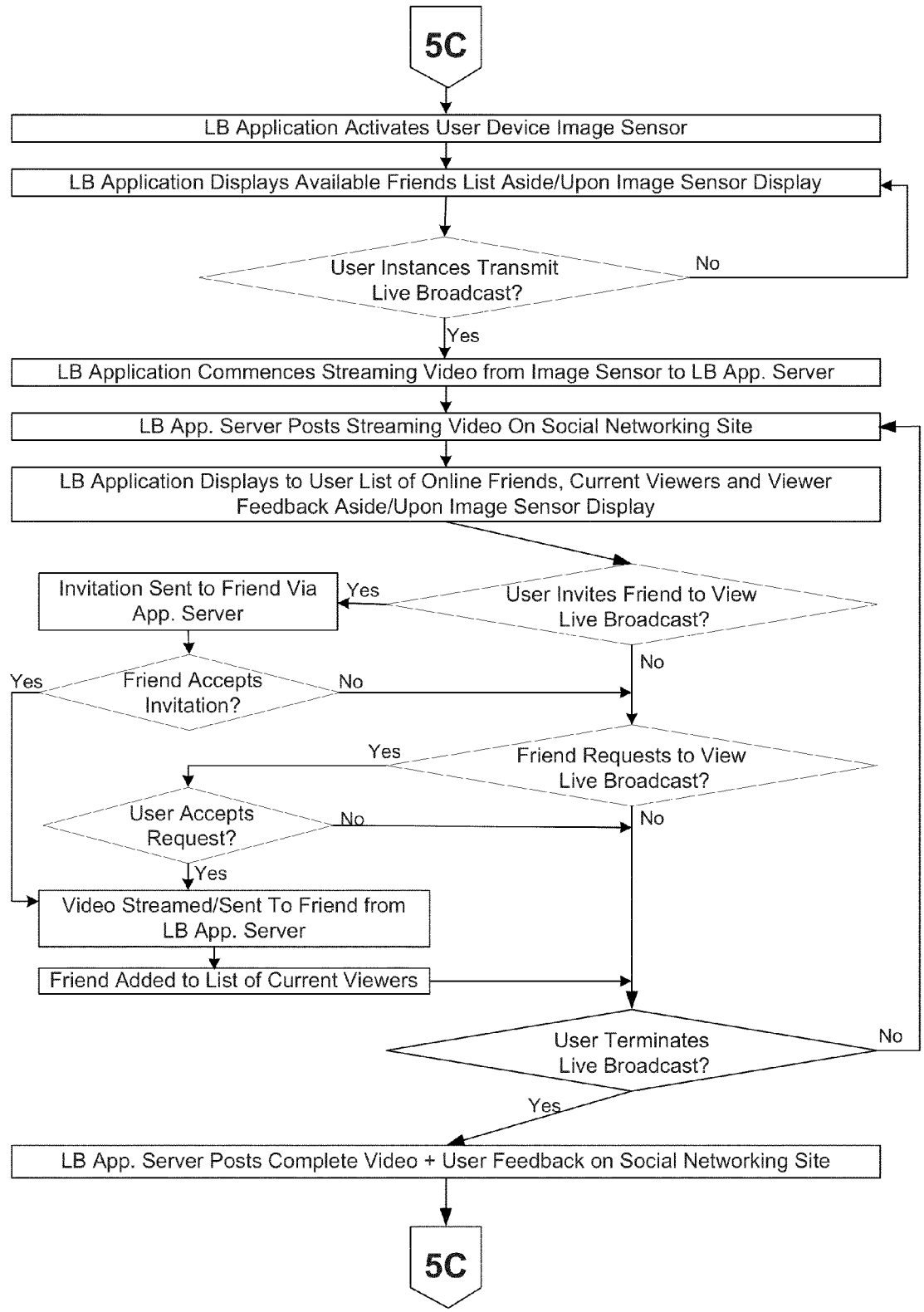
Figure 2C:
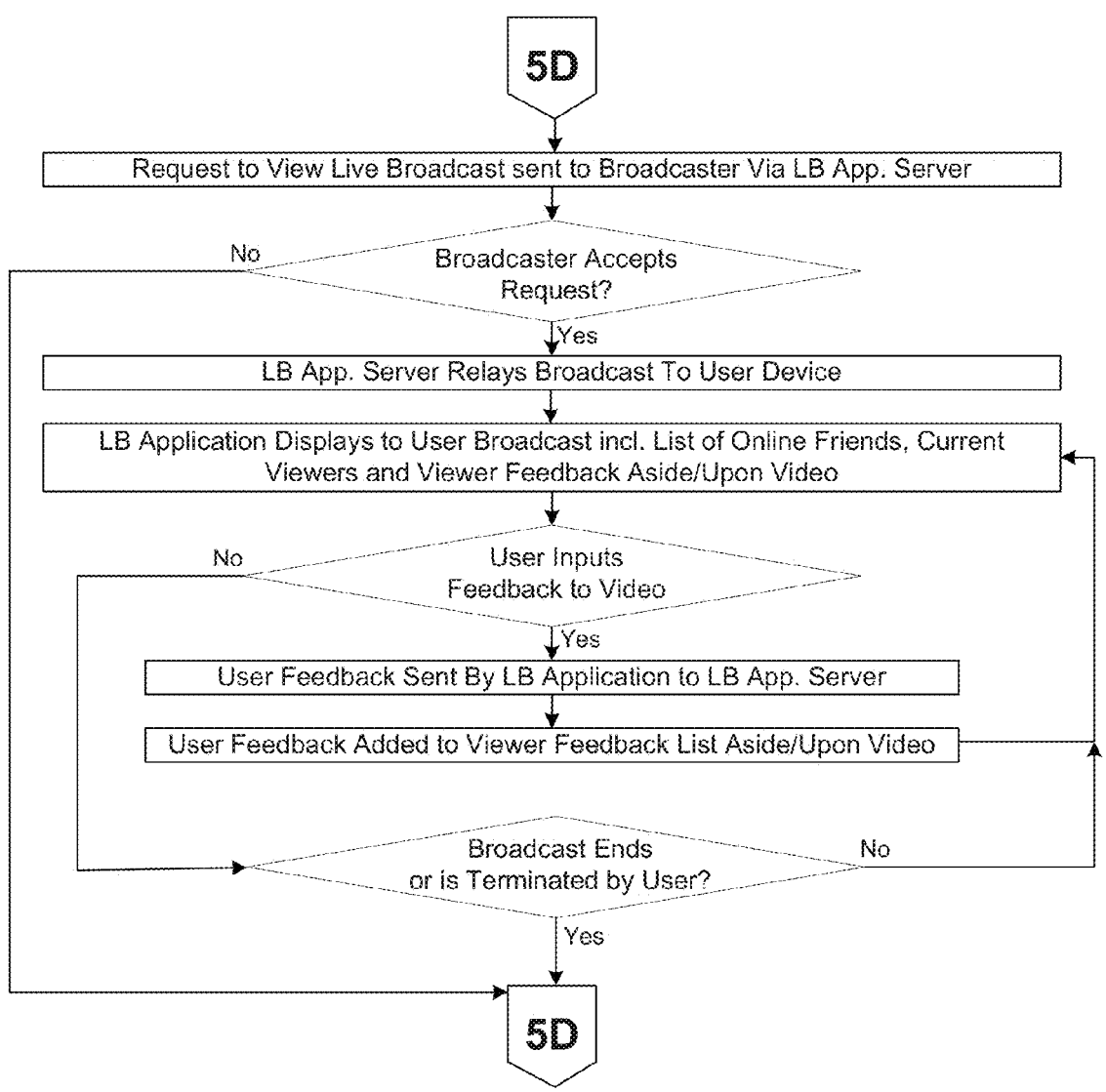
Figure 2D:
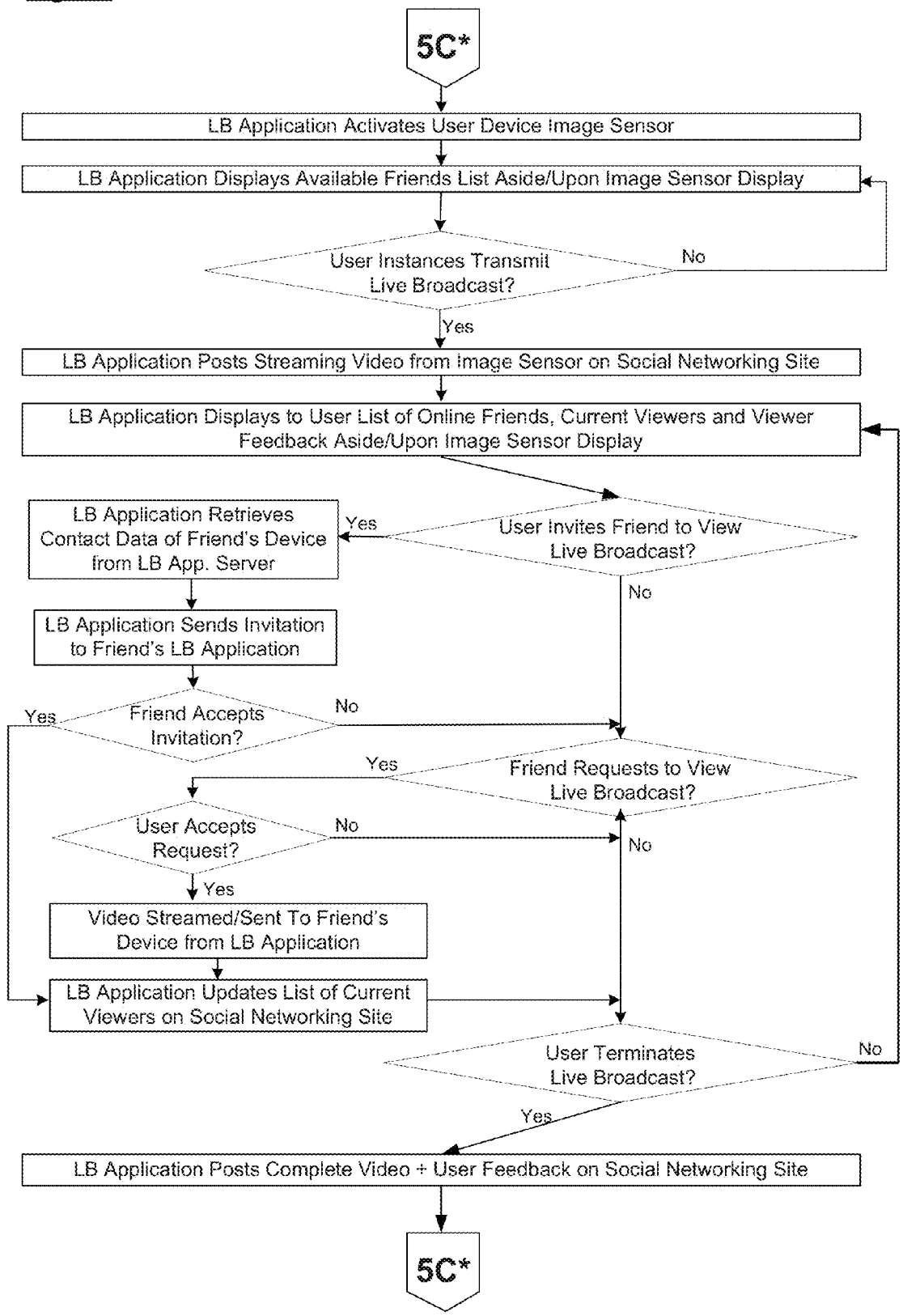
Figure 3A:
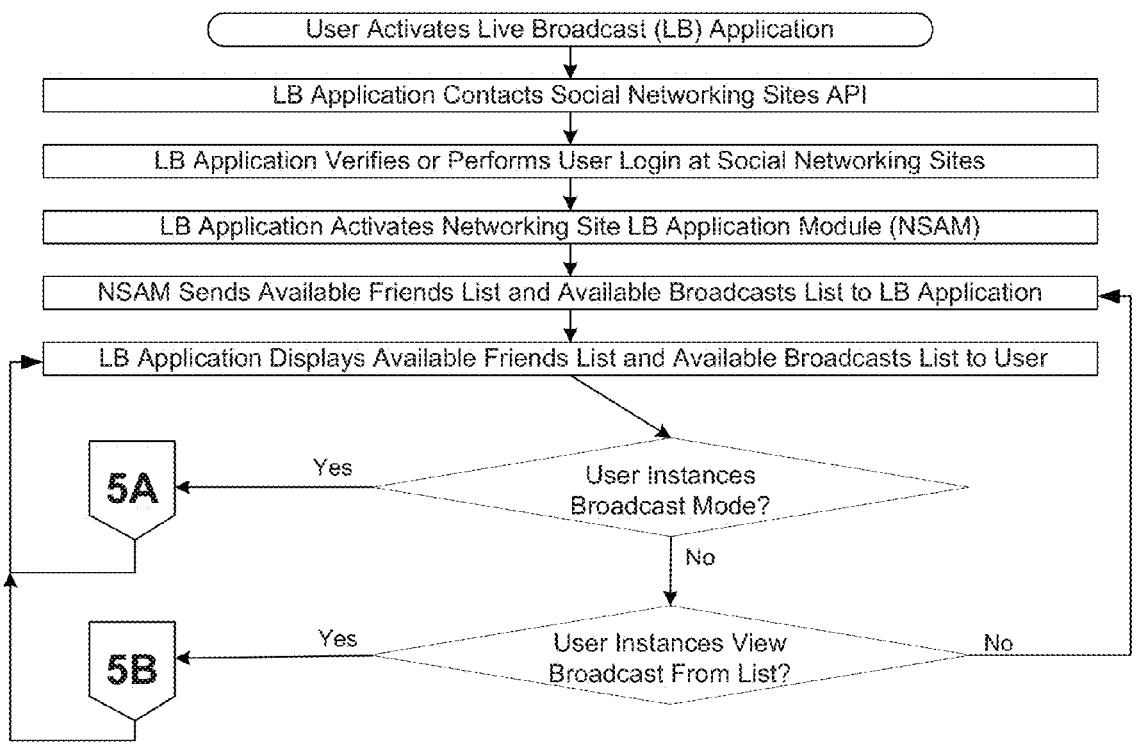
Figure 3B:
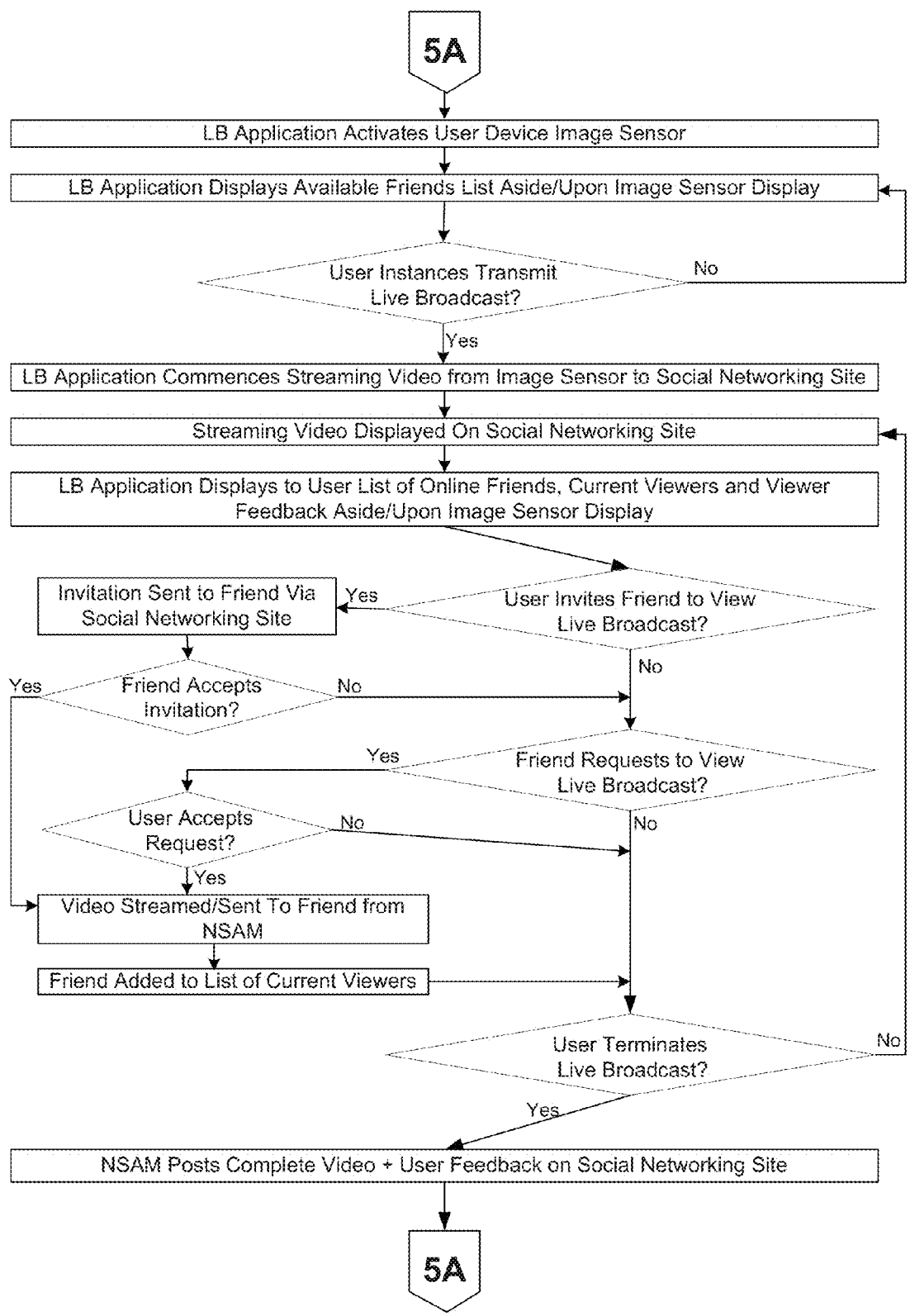
Figure 4:
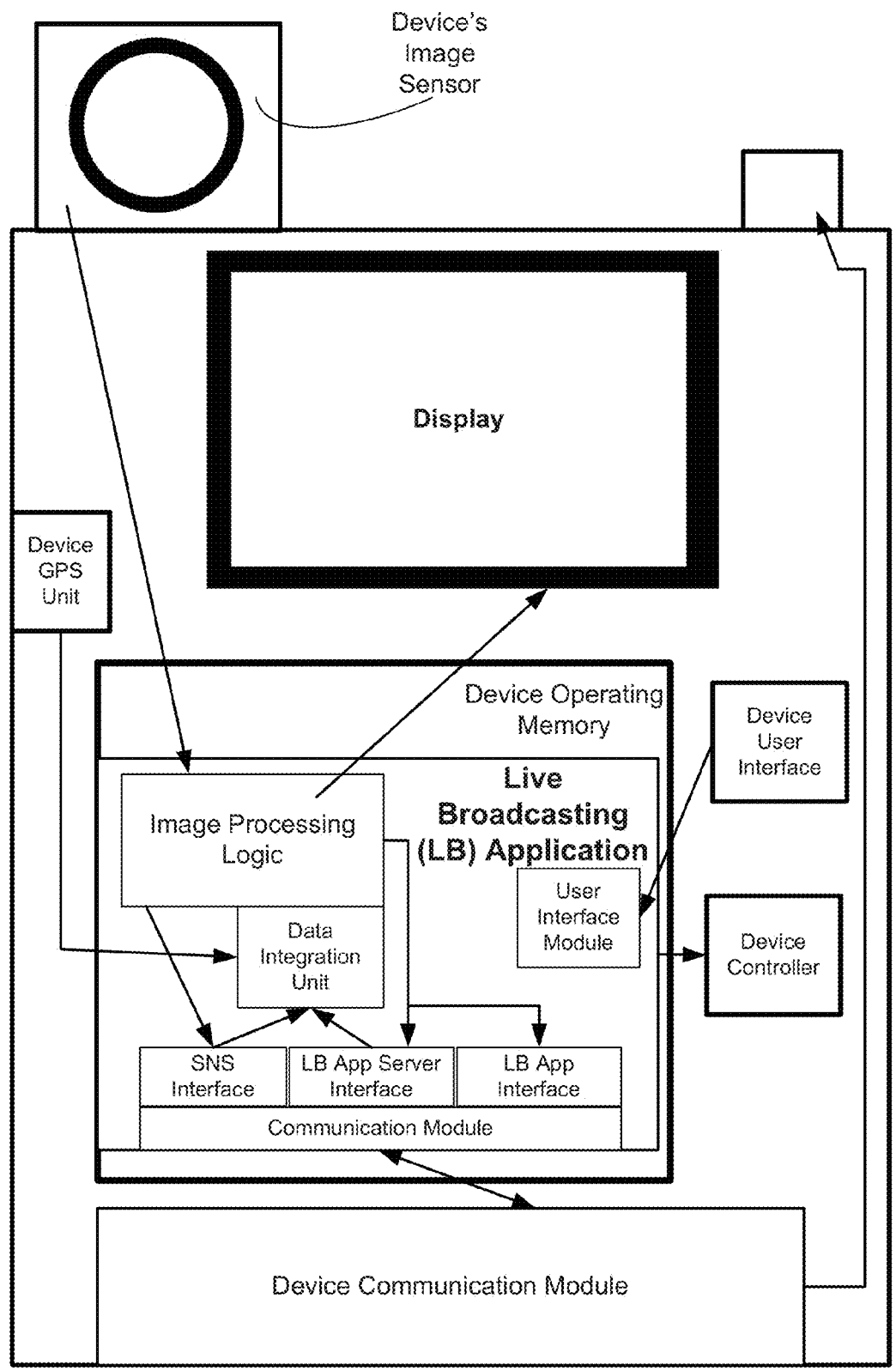
FIG. 4: is a block diagram of an exemplary mobile device including a LB App, in accordance with some embodiments of the present invention.
Figure 5A:
Figure 5B:
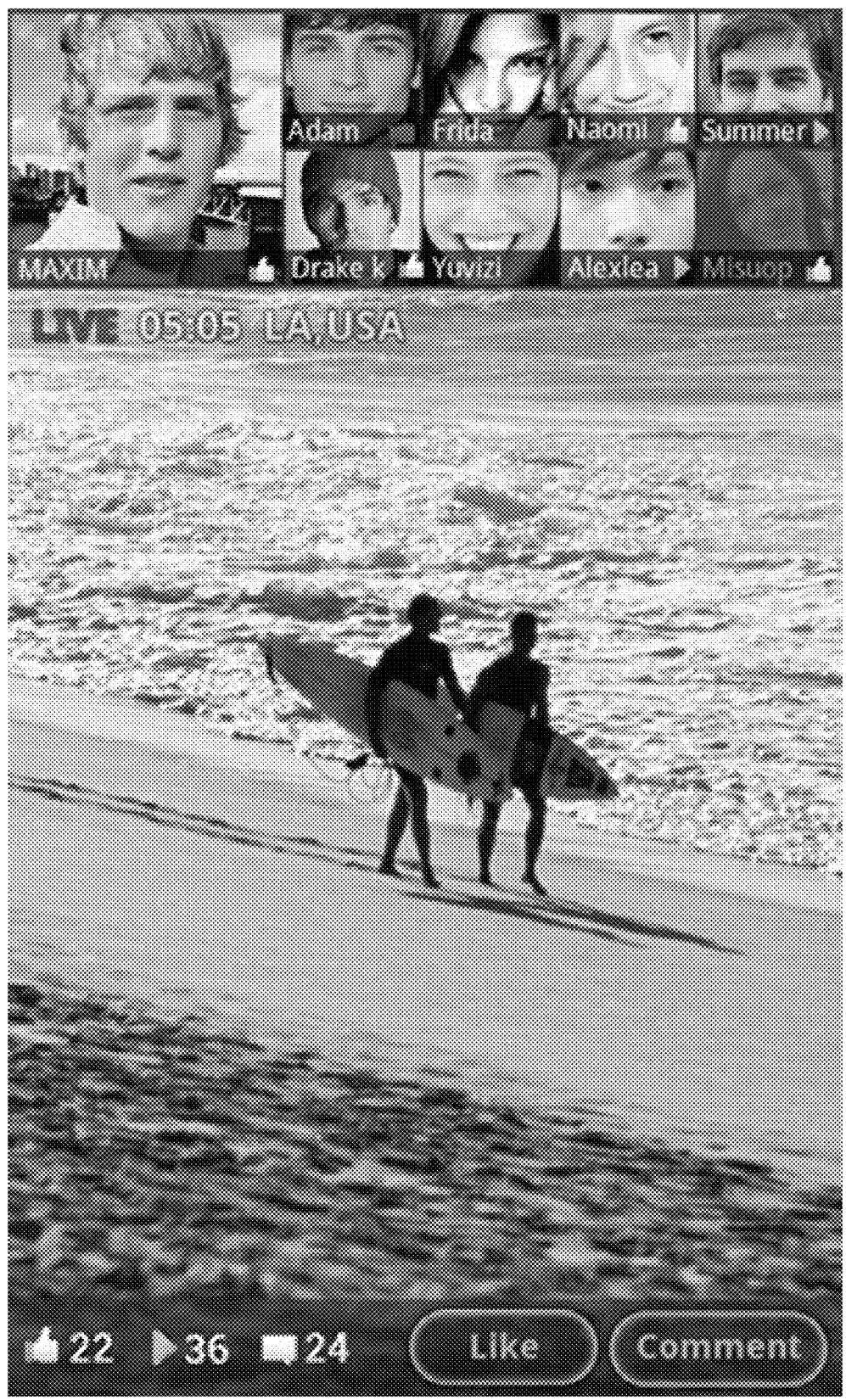
Figure 5C:
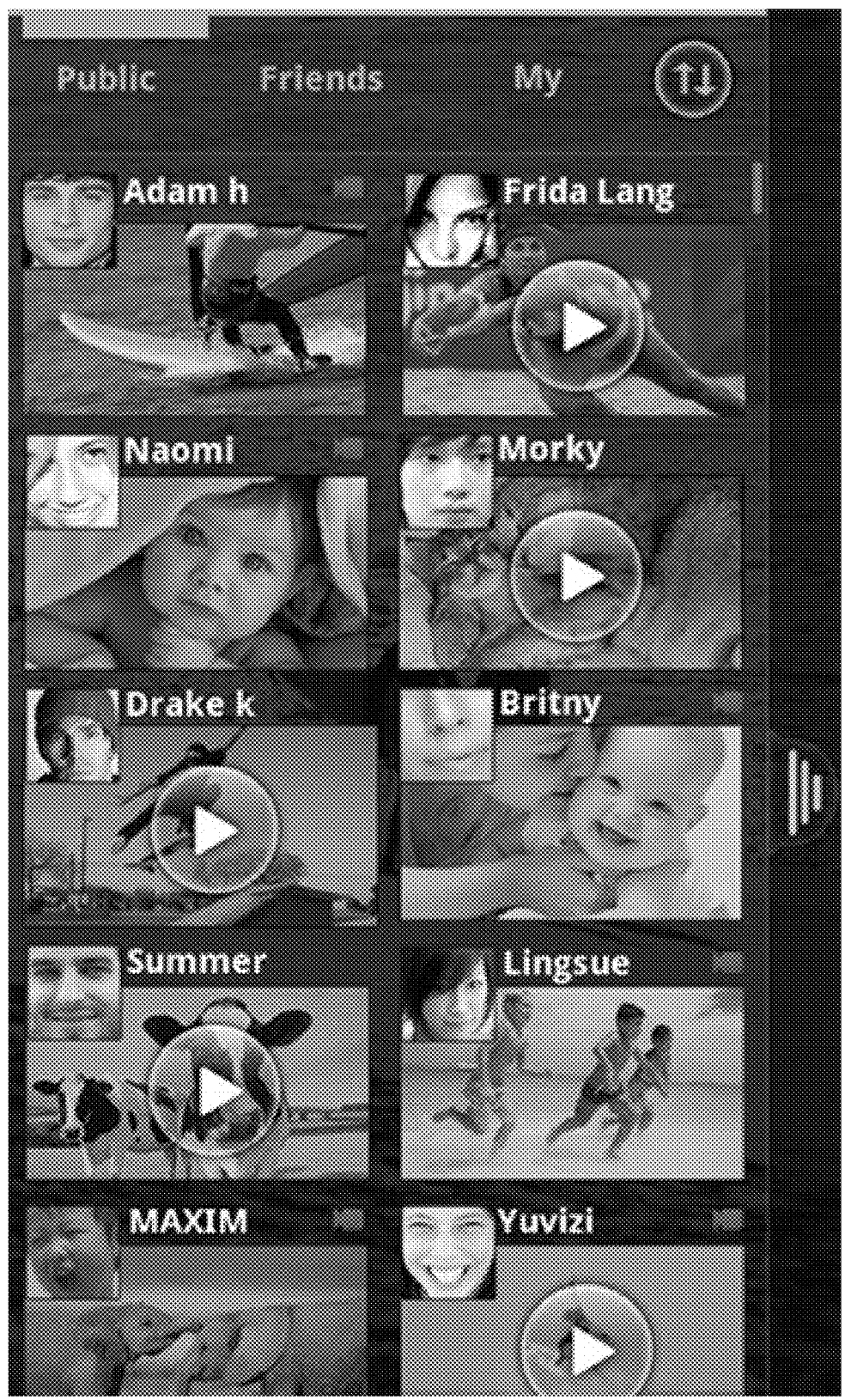
Figure 5D:
Figure 5E:
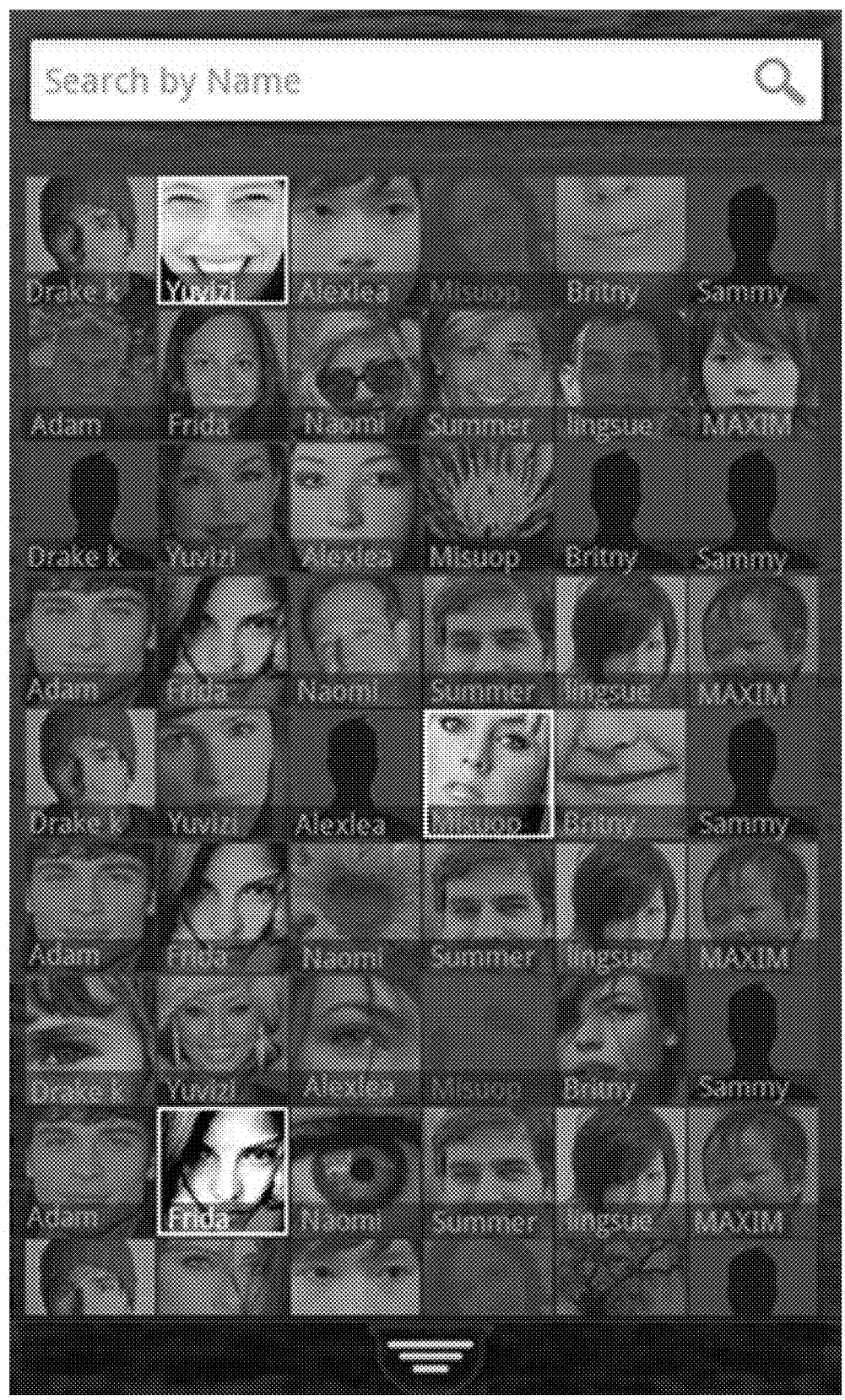

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, memory cards (for example SD card), SIM cards, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer, communication device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language or markup language. It will be appreciated that a variety of programming languages or techniques may be used to implement the teachings of the inventions as described herein.

The present invention includes systems, apparatuses, methods and computer executable code for facilitating broadcast, publication and/or sharing of video from a user device to one or more other user devices in a social networking environment. According to some embodiments of the present invention, there may be provided systems, apparatuses, methods and computer executable code (hereinafter collectively referred to as: "LB Systems") for facilitating live broadcast of video captured by a user device image sensor, to one or more other users associated with the broadcasting user within a social networking site (e.g. facebook). The present invention may further provide for the viewing users to input live feedback (e.g. "like", comments, ratings, etc.) to the broadcasted video and may yet further provide for integrating live feedback into or alongside the broadcasted video. According to yet further embodiments, the present invention may provide for viewing and/or broadcasting users to view data relating to the status of other users associated with them on a social networking site, within or alongside the video, and may further provide for inviting such users to view the live video and/or to request to view a currently broadcasted video.

According to some embodiments, there may be provided a Live Broadcasting Application (hereinafter referred to as a: "LB App") adapted to reside within or be functionally associated with a user device, which user device includes distributed data network access functionality (e.g. a mobile phone). A LB App may be adapted to interact with a user of the associated user device via the device's user interface and once instanced may be adapted to activate and/or receive data from an image sensor of the device. A LB App may be further adapted to communicate by use of the device's communication functionalities, via a distributed data network (e.g. the internet), possibly via a LB App server, with a social networking site or service and with other users who are members of the social networking site or service (social networking sites and services hereinafter collectively referred to as: "SNS"). The LB App may be adapted to receive from SNS, data relating to members of the SNS (e.g. profile picture and online status) and may further display data retrieved from the SNS to a user of the associated device. According to further embodiments, a LB App may be adapted to display data retrieved from SNS alongside or within/upon (e.g. as an overlay) a video being viewed and/or being captured by the user and/or a display of the current view from the device image sensor. A LB App may be further adapted to receive and include in displayed data identities of parties currently viewing the video and/or feedback to the video received from the viewing parties. It should be understood that an LB app, according to some embodiments, may be integral, and/or adapted to be installed in functional association with, a "SNS" application residing locally on the device or on a remote server communicatively coupled to the device and all descriptions herein should be viewed to include such embodiments.

According to some embodiments, a LB System may further include a LB App Server adapted to communicate with LB Applications and/or SNS and to provide, via a distributed data network (e.g. the internet) support and/or communication functionalities to LB Applications. According to further embodiments, some or all of the functionalities of a LB App Server may be performed by modules or servers hosted by, embedded in or otherwise functionally associated with SNS, and all descriptions herein relating to a LB App Server should be understood to apply equally to such embodiments with the relevant modifications. Equally, according to yet further embodiments, some or all of the functionalities of a LB App Server may be performed by an LB App itself, and all descriptions herein relating to a LB App Server should be understood to apply equally to such embodiments with the relevant modifications According to some embodiments, upon instancement, a LB App may contact one or more SNS of which the user of the device is a member, possibly via an appropriate application programming interface of the SNS, and login the user to the SNS or confirm the user is already logged in to the SNS. For this purpose, upon initial instancement/installment of the LB App a user may input the SNS of which he/she is a member and the associated credentials required for logging in (e.g. username and password) and/or an LB app may be adapted to automatically determine which SNS services are provided to the device (e.g. by determining which SNS applications run on the device or by a synchronizing functionality of the device). Alternatively, a LB App may prompt the user to login to one or more SNS. According to yet another alternative, this information may be automatically retrieved from the user device memory. According to further embodiments, a LB App may contact a LB App server, which may perform the communications with the SNS in place of the LB App.

Upon contacting the SNS the LB App or LB App Server may retrieve from the SNS data relating to the user's contacts on the SNS (e.g. online status, current profile picture, etc.) and may display to the user the retrieved data upon the user device display. According to further embodiments, a LB App may further retrieve and display to the user, which of the user's contacts also has a LB App and accordingly, may view or broadcast live broadcasts as described herein. According to yet further embodiments, a LB App may also retrieve a list of broadcasts currently available for viewing from the user's contacts, possibly including data relating to the available broadcasts (e.g. source of the broadcast, location, feedback from other users relating to the broadcast, etc.).

According to further embodiments, upon instancement, a LB App may also activate an image sensor of the user device and display to the user a current view of the image being sensed by the image sensor. According to some embodiments, the data retrieved from the SNS may be displayed upon/aside the current view of the image sensor (e.g. as an overlay).

According to some embodiments, a LB App may include a "Broadcast" mode. Upon instancement of the "Broadcast" mode, a LB App may, if not previously activated, activate an image sensor of the user device and display to the user a current view of the image being sensed by the image sensor. Again, the data retrieved from the SNS may be displayed upon/aside the current view of the image sensor.

Within Broadcast mode, a LB App may include a "record" control element. Upon instancement of the "record" control element, a LB App may commence recording a video clip. According to further embodiments, a LB App may stream (by uni-cast and/or multi-cast) or otherwise broadcast the clip being recorded to the SNS (e.g. as a "post" on the user profile) or the LB App may broadcast the clip to an associated LB App server which may in turn stream or otherwise broadcast the clip being recorded to the SNS. According to further embodiments, streaming of video content as described in this disclosure may include buffering of the video stream.

According to yet further embodiments, a LB App or an associated LB App server may send a notification of the broadcast to contacts of the broadcasting user, possibly via the SNS, which notification may include an invitation to view the live Broadcast. Alternatively, a LB App or associated LB App server may send a notification and/or invitation only to contacts specified by the user (individually or collectively).

According to further embodiments the user may select whether to send a notification/invitation to all contacts, a specific group of contacts or only specified contacts (i.e. select "public", "group" or "private" broadcast).

According to some embodiments, upon receiving a notification/invitation-to-view a live Broadcast, a user may request to view the live broadcast. Alternatively, a user may request to view a live broadcast from a list of current live broadcasts displayed by a LB App. When a user requests to view a live broadcast, the LB App of the broadcaster may, directly or via a LB App server or via a SNS, stream or otherwise broadcast the live broadcast to the requesting user. In those embodiments in which a LB App transmits the broadcast directly to the other users, it may first retrieve contact data for the intended viewer devices (e.g. IP Address) from a LB App Server or a SNS. According to further embodiments, a LB App may uni-cast the broadcast to an associated LB App server which may in turn multi-cast the broadcast to the viewer devices. According to yet further embodiments, a LB App server may uni-cast the broadcast to each of the viewer devices and may modify the broadcast to match the capabilities and/or preferences of the viewing device and user.

According to further embodiments, the LB App may broadcast the live Broadcast to the requesting users only after authorization from the Broadcasting user. The need for authorization may depend on the type of broadcast (e.g. public or private), the relationship with the requesting user (some users may be pre-authorized), whether the user is responding to an invitation or has selected the broadcast from a list (i.e. invited users may not need authorization, etc), and/or any other relevant criteria. A LB App may include options for a user to pre-define the circumstances under which authorization is needed to view his/her broadcasts.

According to some embodiments, the LB App of a Broadcasting user may display aside/upon the video display an indication of the current viewers of his/her live broadcast. For example, icons associated with user contacts may change color or background when the associated user contact is viewing the broadcast. According to further embodiments, a LB App of a viewing user may include options to input feedback to the broadcast (e.g. "like", "dislike", ratings, comments, etc.), possibly in real time. According to further embodiments, a LB App of a broadcasting user may display aside/upon the video display, received feedback, possibly including the source of the feedback. For example, a profile picture of the viewing user that sent the feedback may appear upon the video along with the comment. According to further embodiments, indications of currently viewing users and/or their feedback may be displayed to all users currently viewing the Broadcast.

According to some embodiments, a LB App may be further adapted to determine a geographical location of the broadcasting user (e.g. may retrieve geo data from a GPS unit of the user device) and may display this data upon/aside the broadcast video.

According to some embodiments, data displayed upon/aside a broadcast (viewing users, online users, feedback, geo data, etc) may be inserted by the broadcasting LB App into the streaming video. According to further embodiments, this data may be attached to the streaming video as metadata or transmitted separately and may be inserted into the display by the receiving LB App of the viewer. Alternatively, a combination of the two may be performed. According to some embodiments, an LB App may include a data integration unit adapted to aggregate data to be integrated into a LB display, from different sources (e.g. SNS, other users, device GPS unit, etc.), and integrate the data into the display based on a predefined and/or user defined rule set.

Upon completion of the broadcast (e.g. upon termination of recording by the broadcasting user), a LB App of the broadcasting user or an associated LB App server may post the complete broadcast upon SNS profiles of the broadcasting user, with or without the list of viewers and/or received feedback to the broadcast.

According to some embodiments, a LB App or an associated LB App Server may include image processing circuitry which may be adapted to modify the broadcast based on the requirements of viewing users (e.g. modify bit-rate, resolution etc.) and/or upon request/selection of the broadcasting user. For example, upon selection by a broadcasting user, a LB App or an associated LB App Server may be adapted to add visual effects to the broadcast. Furthermore, a LB App or an associated LB App Server may include image processing circuitry adapted to modify the image data received from the image sensor based on user preference, user selection and/or automatically. For example, the image processing circuitry may be adapted to apply color filters to the received data, adjust brightness/contrast of the images, apply digital magnification to the images, etc.

According to further embodiments of the present invention, a user of a LB App may subscribe to specific broadcasters such that the user is notified whenever a broadcaster to which he is subscribed posts a new broadcast. Similarly, users may form broadcasting groups, such that each member of a group is automatically invited to any broadcast of a member of the group.

According to further embodiments of the present invention, a LB App or an associated LB App Server may include "Tagging" options allowing users to identify persons or objects appearing in a broadcast. Tagged users may receive notifications of broadcasts in which they were tagged and/or a post of the broadcast may be added to their SNS profile(s).

According to yet further embodiments, a LB App may include options to view previous broadcasts, with or without associated data (e.g. the list of viewers, received feedback, geo tags, etc.). Viewing of previous broadcasts may be facilitated by the Broadcaster's LB App, an associated LB App server and/or the SNS.

According to further embodiments, a LB App may further include options to link a broadcast to one or more other broadcasts, either current or previous, either from the same broadcaster or from different broadcasters. Linked broadcasts may share a commonality (e.g. broadcasts from the same location, broadcasts of similar events, etc). An indication of a Broadcast's links may be displayed within/alongside a broadcast and may further include a characterization of the link/commonality. Furthermore, a LB App may include an option to view linked broadcasts simultaneously or in succession.

According to yet further embodiments, a LB App may provide for viewing two or more broadcasts (linked or not linked) simultaneously. For example, if two users are broadcasting a live broadcast of an event, from different angles, these broadcasts may be linked or otherwise associated with each other, automatically, by the broadcasters, and/or by a viewer. The viewers may then be able to view both broadcasts of the event side by side. In embodiments providing for viewing of multiple broadcasts simultaneously, simultaneous viewing may involve: (1) displaying one broadcast beside another (i.e. a divided screen), (2) "toggling" between broadcasts, (3) picture in picture type broadcast, (4) any other method of displaying multiple broadcasts, and/or (5) any combination thereof. Simultaneous viewing of multiple broadcasts may be provided for: (1) by the viewing LB App, i.e. the broadcasts may be sent to the viewer separately and combined by the local LB application, (2) by a broadcasting LB App, i.e. the LB App of the broadcasters who has linked his broadcast to one or more other broadcasts may combine the videos and send them as a single video stream, (3) by a LB App Server, i.e. an LB App server may receive each broadcast separately, combine them, and transmit the combined videos as a single video stream to the viewing LB Apps.

According to further embodiments, a LB App may be adapted to broadcast a live broadcast via multiple SNS simultaneously. In such embodiments, an LB App may be yet further adapted to aggregate data regarding contacts, viewers and feedback, and display the data to the user in an aggregated form, possibly including indications of the source of data.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for facilitating live broadcast of video, said system comprising:
    a live broadcasting (LB) server;
    a processor functionally associated with a digital memory, which digital memory stores processor executable code adapted to cause one or more processors of a mobile communication device to:
    (i) communicate with said LB server over a distributed data network and stream, substantially in real time, to said server a video sequence being captured via a native image sensor of said mobile communication device, which native image sensor is an integral component of said mobile communication device wherein said LB server broadcasts, via the distributed data network, the video sequence, as it is being captured, to one or more social networking site friends of a user of said mobile communication device, wherein a social networking friend of a given user is an individual associated with the given user on a social networking site and the social networking site is a web based social networking service hosted by one or more servers and operated by a third party;
    (ii) receive, using the communication circuitry of said mobile communication device, feedback to the video from the one or more social networking site friends; and
    (iii) display, upon a native display of said mobile communication device, the received feedback in conjunction with a display of the video sequence, during the capture of the video sequence;
    wherein said LB server comprises an application programming interface (API) for communicating with the one or more servers hosting the social networking site and is adapted to: (1) automatically post, within a listing stored on the one or more servers hosting the social networking site, using said API, an indication of the broadcast of the video sequence, which listing is associated with the user of the mobile communication device, (2) retrieve from the one or more servers hosting the social networking site feedback to the video clip, posted upon the social networking site, and (3) relay the feedback to the mobile communication device.

2. The system according to claim 1, wherein said processor executable code is further adapted to cause the one or more processors of the mobile communication device to simultaneously broadcast the video sequence, as it is being captured, to multiple social networking site friends of the user of said mobile communication device.

3. The system according to claim 1, wherein said processor executable code is further adapted to cause the one or more processors of the mobile communication device to display the received feedback as an overlay on the display of the video sequence.

4. The system according to claim 1, wherein said processor executable code is further adapted to cause the one or more processors of the mobile communication device to display, during the broadcast of the video sequence, an indication of which social networking site friends of the user of said mobile communication device are currently viewing the broadcast.

5. The system according to claim 1, wherein said processor executable code is further adapted to cause the one or more processors of the mobile communication device to include in the broadcast an indication of a geographical location of said mobile communication device.

6. The system according to claim 1, wherein said processor executable code is further adapted to cause the one or more processors of the mobile communication device to modify the video sequence prior to broadcast.

7. A system for facilitating live broadcast of video, said system comprising:
    a live broadcasting (LB) server;
    a mobile communication device comprising:
        communication circuitry adapted to communicate over a distributed data network;
        a native image sensor of said mobile communication device, which native image sensor is an integral component of said mobile communication device;
        a broadcasting module, residing on processing circuitry of said mobile communication device, adapted to communicate with said LB server over a distributed data network and stream, substantially in real time, to said server, via the distributed data network, a video sequence being captured by said native image sensor, as it is being captured, wherein said LB server broadcasts, via the distributed data network, the video sequence, as it is being captured, to one or more social networking site friends of a user of said mobile communication device, wherein a social networking friend is an individual associated with the user on a social networking site and the social networking site is a web based social networking service supported by one or more servers and operated by a third party;

a feedback module, residing on the processing circuitry of said mobile communication device, adapted to receive feedback to the video from the one or more social networking site friends;

a display module, residing on the processing circuitry of said mobile communication device, adapted to display, upon a native display of said mobile communication device, the received feedback in conjunction with a display of the video sequence, during the capture of the video sequence; and an application programming interface (API) for communicating with the one or more servers supporting the social networking site;

wherein said mobile communication device is further adapted to: (1) automatically post, within a listing stored on the one or more servers supporting the social networking site, using said API, an indication of the broadcast of the video sequence, which listing is associated with the user of the mobile communication device, and (2) retrieve, using said API, feedback to the video clip, posted upon the social networking site;

and said LB server is operated by a different party than the one or more servers supporting the social networking site.

8. The system according to claim 7, wherein said LB server is adapted to simultaneously broadcast the video sequence captured by said native image sensor, as it is being captured, to multiple social networking site friends of the user of said mobile communication device.

9. The system according to claim 7, wherein said display module is adapted to display the received feedback as an overlay on the display of the video sequence.

10. The system according to claim 7, wherein said display module is further adapted to display, during the broadcast of the video sequence, an indication of which social networking site friends of the user of said mobile communication device are currently viewing the broadcast.

11. The system according to claim 7, wherein said broadcasting module is further adapted to include in the broadcast an indication of a geographical location of said mobile communication device.

12. The system according to claim 7, further comprising image processing circuitry adapted to modify the video sequence prior to broadcast.

13. The system according to claim 12, wherein said image processing circuitry is adapted to add visual effects to the video sequence.

14. A method for facilitating live broadcast of video, said method comprising:

capturing a video sequence using a native image sensor of a mobile communication device, which native image sensor is an integral component of the mobile communication device;

communicating, using communication circuitry of said mobile phone, via a distributed data network, with a live broadcasting (LB) server and streaming the video sequence to the LB server, as it is being captured;

broadcasting, by the LB server, via the distributed data network, the video sequence, as it is being captured, to one or more social networking site friends of a user of said mobile communication device, wherein a social networking friend of a given user is an individual associated with the given user on a social networking site and the social networking site is a web based social networking service hosted by one or more servers and operated by a third party;

using an application programming interface (API) for communicating with the one or more servers hosting the social networking site to automatically post within a listing stored on the one or more servers hosting the social networking site an indication of the broadcast of the video sequence, which listing is associated with the user of the mobile communication device;

streaming, by the LB server, the video clip, to the one or more social networking site friends of the user;

retrieving from the one or more servers hosting the social networking site, using the communication circuitry of said mobile communication device, feedback to the video posted within the social networking site by the one or more social networking site friends of the user; and displaying, upon a native display of said mobile communication device, the retrieved feedback, in conjunction with a display of the video sequence, during the capture of the video sequence.

15. The method according to claim 14, further comprising displaying the retrieved feedback as an overlay on the display of the video sequence.

16. The method according to claim 14, further comprising displaying, during the broadcast of the video sequence, an indication of which social networking site friends of the user of said mobile communication device are currently viewing the broadcast.

17. The method according to claim 14, further comprising including in the broadcast an indication of a geographical location of said mobile communication device.

18. The method according to claim 14, further comprising modifying the video sequence prior to broadcast.

19. The method according to claim 18, wherein modifying includes adding visual effects to the video sequence.

20. The method according to claim 14, further comprising simultaneously broadcasting the video sequence, as it is being captured, to multiple social networking site friends of the user of said mobile communication device.

* * * * *